(No Model.)
E. M. BRIEDWELL.
ANTI-FRICTION AXLE BOX.
No. 467,968. Patented Feb. 2, 1892.
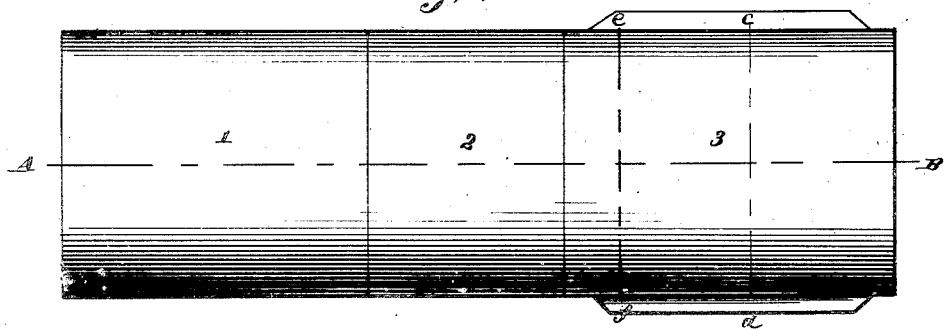
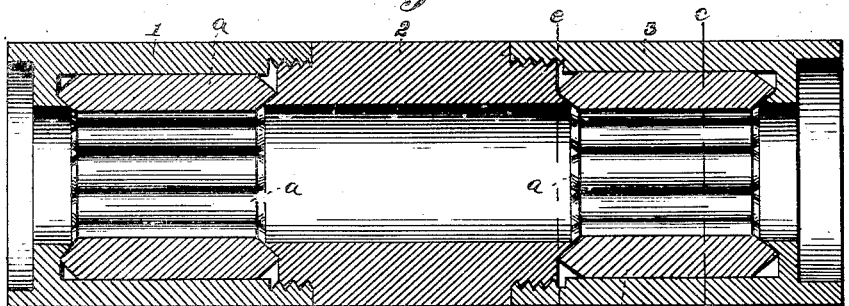
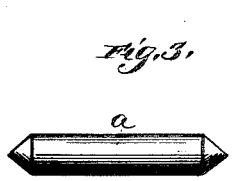
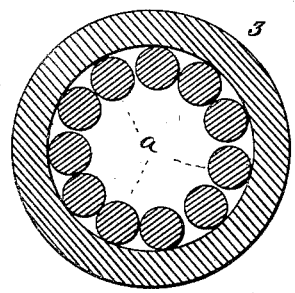
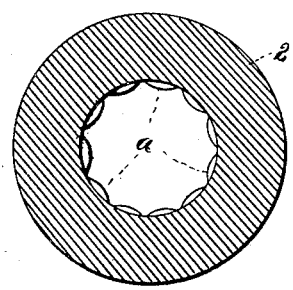
Witnesses:
Inventor,
Edgar M. Briedwell,

UNITED STATES PATENT OFFICE.

EDGAR M. BRIEDWELL, OF McMINNVILLE, ASSIGNOR OF ONE-HALF TO MARK HOLMES, OF McCOY, OREGON.

ANTI-FRICTION AXLE-BOX.

SPECIFICATION forming part of Letters Patent No. 467,968, dated February 2, 1892.

Application filed March 4, 1891. Serial No. 383,797. (No model.)

*To all whom it may concern:*

Be it known that I, EDGAR M. BRIEDWELL, a citizen of the United States, residing at McMinnville, in the county of Yamhill and State of Oregon, have invented a new and useful box with anti-friction bearings in the shape of cylinders for wagons, carriages, buggies, and all kinds of vehicles, all of which is shown in the accompanying drawings, and letters and figures marked thereon, which form a part of this specification.

My said invention is applicable to all kinds of revolving journals, shafts, and spindles, whereby the friction incident to the revolution of such journals, shafts, and spindles is very materially lessened and the durability very much increased thereby; also, the amount of oil and the frequency of its application is very much lessened.

Figure 1 is a view showing the exterior wall of the box. Fig. 2 shows the interior of the box on the elevation A B. Fig. 3 shows one of said anti-friction bearings or cylinders. Fig. 4 is a cross-section taken at the line *c d*. Fig. 5 is also a cross-section at the line *e f*. These five views are necessary to fully illustrate my wagon-box.

The leading feature of my wagon-box is the construction of same in three pieces or sections, together with the bearings, as shown in cylinder form, Fig. 3, having conical-shaped ends. They are to be made of tempered steel and placed in each end of the box, (which box is to be made of cast-iron), to wit: (*a*) in sections 1 and 3, Fig. 2, where they are held in place by a flange or rim while the box may be taken from the journal, shaft, or spindle. Further, the bearings rest on the interior wall of the box, as shown in Fig. 4. This allows a ready revolving motion of same when brought in contact with the journal, shaft, or spindle and thereby lessens the draft. Section 2 or the center section of the box does not come in contact with the journal, shaft, or spindle, but is held at a respectful distance by the bearings, as shown in Fig. 5. Sections 1 and 3 are made to join by means of screw applications to section 2, as shown in Fig. 2. The same may easily be detached and the cylinders removed. When joined together with the cylinders inclosed, it makes a neat and compact box. The exterior wall of the box is the same size at each end, as shown in Fig. 1, instead of being larger at one end and smaller at the other end, as in the ordinary box. The interior of the box at each end is also the same size as shown in sections 1 and 3, Fig. 2, hence requiring the shaft or spindle to be the same diameter at the shoulder as at the outer end of same. There is a rim on each end of the box. One extends over the shoulder on the spindle and the other over the nut on outer end of same, as shown in Fig. 2, thus keeping out dust, &c. The box is placed on the inside of hubs of wagons, carriages, buggies, and other vehicles, the same as the ordinary box. The oil is applied to the journal, shaft, or spindle as in ordinary cases.

I am aware that cylinder-bearings have been used in bicycles and sheave-blocks, but with flat or plain ends instead of conical-shaped ones, as shown in Fig. 3.

Having fully described my invention, what I claim, and desire to obtain by Letters Patent, is—

1. The combination, with the hub of wheels of wagons, carriages, buggies, and other vehicles, of a box therein consisting of a series of three threaded sections, the two end sections having a flange or rim which forms a groove on the interior wall of the out ends of same, and the center section having a flange or rim on each end of same which forms a groove and contains and holds in place, when fastened together, a ring of small cylinders with conical-shaped ends longitudinally located in each end of said box, substantially as set forth.

2. The combination, with the hub of wheels of wagons, carriages, buggies, and other vehicles, of a removable box inserted therein, consisting of a series of three threaded sections, the two end sections having a flange or rim which forms a groove on the interior wall of the outer ends of same, and the center section having a flange or rim on each end of same which forms a groove and holds in place when fastened together a ring of anti-friction cylinder-bearings with conical-shaped ends longitudinally located in each end of said box, substantially as described.

3. The combination, with the hub of wheels of wagons, carriages, buggies, and other vehicles, of a box therein inserted consisting of three threaded sections 1 2 3, having a ring of anti-friction cylinder-bearings with conical-shaped ends contained and held in place in each end of said box longitudinally by the flange or rim on each end of the center section, which forms a groove when said sections are joined together, and the flange or rim which forms a groove on the interior wall of the outer end of each of the end sections of said box, substantially as described and set forth in the foregoing drawings and specification.

EDGAR M. BRIEDWELL.

Witnesses:
  MARK HOLMES,
  CHAS. W. TALMAGE.